United States Patent
Ozturk et al.

(10) Patent No.: US 8,346,839 B2
(45) Date of Patent: Jan. 1, 2013

(54) EFFICIENT ADVANCED ENCRYPTION STANDARD (AES) DATAPATH USING HYBRID RIJNDAEL S-BOX

(75) Inventors: Erdinc Ozturk, Worcester, MA (US); Vinodh Gopal, Westboro, MA (US); Gilbert Wolrich, Framingham, MA (US); Wajdi K. Feghali, Boston, MA (US); Kirk S. Yap, Framingham, MA (US)

(73) Assignee: Intel Corporation, Santa Clara, CA (US)

( * ) Notice: Subject to any disclaimer, the term of this patent is extended or adjusted under 35 U.S.C. 154(b) by 1274 days.

(21) Appl. No.: 11/731,159

(22) Filed: Mar. 30, 2007

(65) Prior Publication Data

US 2008/0240422 A1 Oct. 2, 2008

(51) Int. Cl.
*G06F 7/52* (2006.01)
(52) U.S. Cl. ........................................ 708/620
(58) Field of Classification Search .................. 708/495, 708/620–632, 200
See application file for complete search history.

(56) References Cited

U.S. PATENT DOCUMENTS

| | | | | |
|---|---|---|---|---|
| 4,667,301 A * | 5/1987 | Chiu et al. | ..................... | 708/250 |
| 5,289,397 A * | 2/1994 | Clark et al. | ..................... | 708/491 |
| 5,402,369 A * | 3/1995 | Main | ............................. | 708/625 |
| 6,144,980 A * | 11/2000 | Oberman | ...................... | 708/627 |
| 7,046,723 B2 * | 5/2006 | Schier et al. | ................. | 375/229 |
| 7,296,049 B2 * | 11/2007 | Hojsted | ......................... | 708/625 |
| 2003/0182343 A1 * | 9/2003 | Hojsted | ......................... | 708/625 |
| 2004/0184602 A1 | 9/2004 | Nadehara | | |
| 2005/0207571 A1 * | 9/2005 | Ahn et al. | ....................... | 380/28 |
| 2006/0020654 A1 * | 1/2006 | Hubert | ............................ | 708/492 |
| 2006/0059220 A1 * | 3/2006 | Koshy et al. | .................. | 708/491 |
| 2006/0080376 A1 * | 4/2006 | Zhang et al. | ................... | 708/492 |

OTHER PUBLICATIONS

Office Action received for German Patent Application No. 102008016530.1, mailed on Sep. 1, 2010, 5 pages of English translation.
Office Action received for Chinese Patent Application No. 200810109256.0, mailed on Oct. 26, 2010, 5 pages of English translation.
"Specification for the Advanced Encryption Standard (AES)", Federal Information Processing Standards Publication 197, Nov. 26, 2001, pp. 51.
Office Action received for Chinese Patent Application No. 200810109256.0, mailed on Apr. 13, 2011, 3 pages of office action and 5 pages of English translation.
Office Action received for German Patent Application No. 102008016530.1, mailed on Sep. 1, 2010, 4 pages of office action and 5 pages of English translation.
Office Action dated Aug. 25, 2011 issued in related Chinese Patent Application No. 200810109256.0.

* cited by examiner

*Primary Examiner* — Tan V. Mai
(74) *Attorney, Agent, or Firm* — Grossman, Tucker, Perreault & Pfleger, PLLC

(57) ABSTRACT

The speed at which an AES decrypt operation may be performed in a general purpose processor is increased by providing a separate decrypt data path. The critical path delay of the aes decrypt path is reduced by combining multiply and inverse operations in the Inverse SubBytes transformation. A further decrease in critical path delay in the aes decrypt data path is provided by merging appropriate constants of the inverse mix-column transform into a map function.

15 Claims, 8 Drawing Sheets

EFFICIENT ADVANCED ENCRYPTION STANDARD (AES) DATAPATH USING HYBRID RIJNDAEL S-BOX

FIELD

This disclosure relates to cryptographic algorithms and in particular to the advanced encryption standard (AES) algorithm.

BACKGROUND

Cryptology is a tool that relies on an algorithm and a key to protect information. The algorithm is a complex mathematical algorithm and the key is a string of bits. There are two basic types of cryptology systems: secret key systems and public key systems. A secret key system also referred to as a symmetric system has a single key ("secret key") that is shared by two or more parties. The single key is used to both encrypt and decrypt information.

The Advanced Encryption Standard (AES), published by the National Institute of Standards and Technology (NIST) as Federal Information Processing Standard (FIPS) 197 is a secret key system. AES is a symmetric block cipher that can encrypt and decrypt information.

Encryption (cipher) performs a series of transformations using the secret key (cipher key) to transforms intelligible data referred to as "plaintext" into an unintelligible form referred to as "cipher text". The transformations in the cipher include (1) Adding a round key (value derived from the cipher key) to the state (a two dimensional array of bytes) using a Exclusive OR (XOR) operation; (2) Processing the state using a non-linear byte substitution table (S-Box) (3) Cyclically shifting the last three rows of the state by different offsets; and (4) Taking all of the columns of the state and mixing their data (independently of one another) to produce new columns.

Decryption (inverse cipher) performs a series of transformations using the cipher key to transform the "cipher text" blocks into "plaintext" blocks of the same size. The transformations in the inverse cipher are the inverse of the transformations in the cipher.

The Rijndael algorithm is specified in the AES standard to process data blocks of 128 bits, using cipher keys with lengths of 128, 192 and 256 bits. The different key lengths are typically referred to as AES-128, AES-192 and AES-256.

The AES algorithm transforms the plaintext into cipher text or cipher text into plaintext in 10, 12, or 14 consecutive rounds, with the number of rounds dependent on the length of the key.

BRIEF DESCRIPTION OF THE DRAWINGS

Features of embodiments of the claimed subject matter will become apparent as the following detailed description proceeds, and upon reference to the drawings, in which like numerals depict like parts, and in which:

Although the following Detailed Description will proceed with reference being made to illustrative embodiments of the claimed subject matter, many alternatives, modifications, and variations thereof will be apparent to those skilled in the art. Accordingly, it is intended that the claimed subject matter be viewed broadly, and be defined only as set forth in the accompanying claims.

DETAILED DESCRIPTION

The Advanced Encryption Standard (AES) algorithm is a compute intensive algorithm that is typically performed in software or in a special purpose processor. Thus, encryption is typically only used for encrypting a subset of the information stored in computers, for example, information that may be classified as "top secret". However, there is a need to encrypt more of the information that is stored on computers. For example, if all information stored on a mobile computer was encrypted, this information would be protected in the event that the mobile computer was stolen.

Typically, a series of transformations for both encrypt and decrypt are combined into a single data path. This results in the addition of delays due to the need to determine at various stages whether the operation being performed is encryption or decryption in order to select the appropriate transformation. As the delay is added to the critical path it reduces the speed at which the encrypt/decrypt operations may be performed.

With the paths separated, each path may be individually optimized to reduce delays. The inverse cipher transformations include an inverse S-box transformation that processes the state using a non-linear byte substitution table (S-Box) and an inverse mix columns transformation that takes all of the columns of the state and mixes their data (independently of one another) to produce new columns. Both these transformations require multiplication operations and multiple XOR operations which add to the critical path delay especially in the decrypt path.

The critical delay path through the inverse mix columns and inverse S-box in the decrypt data path may be reduced by combining the inverse s-box and inverse Mix Column operations according to an embodiment of the present invention.

As both inverse S-box and polynomial multiplication operations are combinations of XOR logic, in an embodiment of the present invention, the polynomial multiplication operations for the inverse mix column operations are embedded in the inverse s-box.

Figure 1:
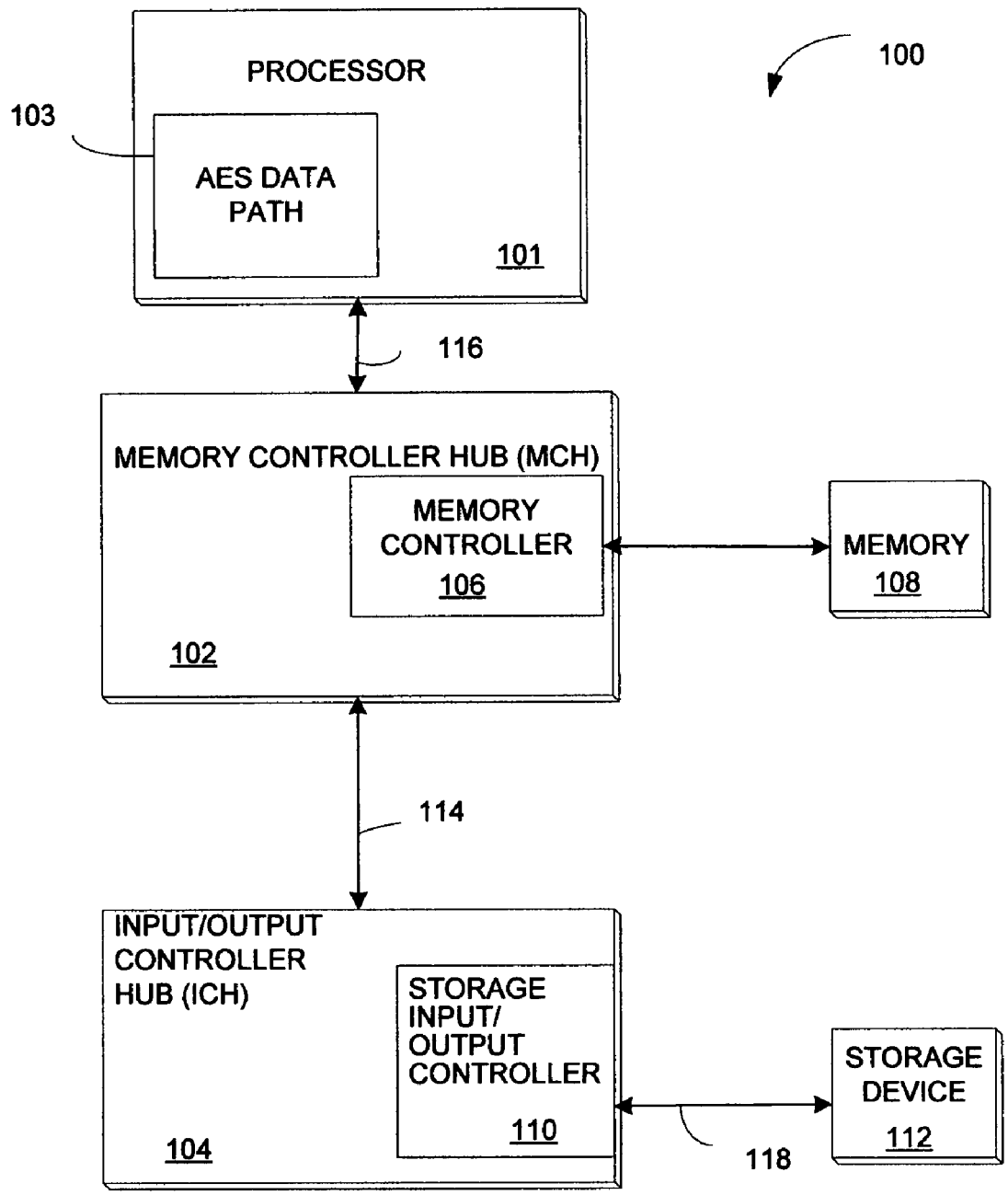
FIG. 1 is a block diagram of a system that includes an aes data path for performing AES encrypt or decryption round operations in a general purpose processor.

FIG. 1 is a block diagram of a system 100 that includes an aes data path 103 for performing AES encrypt or decrypt round operations in a general purpose processor. The system 100 includes a processor 101, a Memory Controller Hub (MCH) 102 and an Input/Output (I/O) Controller Hub (ICH) 104. The MCH 102 includes a memory controller 106 that controls communication between the processor 101 and memory 108. The processor 101 and MCH 102 communicate over a system bus 116. The processor 101 may be any one of a plurality of processors such as a single core Intel® Pentium IV® processor, a single core Intel Celeron processor, an Intel® XScale processor or a multi-core processor such as Intel® Pentium D, Intel® Xeon® processor, or Intel® Core® Duo processor or any other type of processor. The aes data path 103 in the processor 101 may perform aes encrypt and decrypt round operations on data that may be stored in memory 108 and/or stored in the storage device 112.

The memory 108 may be Dynamic Random Access Memory (DRAM), Static Random Access Memory (SRAM), Synchronized Dynamic Random Access Memory (SDRAM), Double Data Rate 2 (DDR2) RAM or Rambus Dynamic Random Access Memory (RDRAM) or any other type of memory.

The ICH 104 may be coupled to the MCH 102 using a high speed chip-to-chip interconnect 114 such as Direct Media Interface (DMI). DMI supports 2 Gigabit/second concurrent transfer rates via two unidirectional lanes.

The ICH 104 may include a storage I/O controller 110 for controlling communication with at least one storage device 112 coupled to the ICH 104. The storage device may be, for example, a disk drive, Digital Video Disk (DVD) drive, Compact Disk (CD) drive, Redundant Array of Independent Disks (RAID), tape drive or other storage device. The ICH 104 may communicate with the storage device 112 over a storage protocol interconnect 118 using a serial storage protocol such as, Serial Attached Small Computer System Interface (SAS) or Serial Advanced Technology Attachment (SATA).

Figure 2:
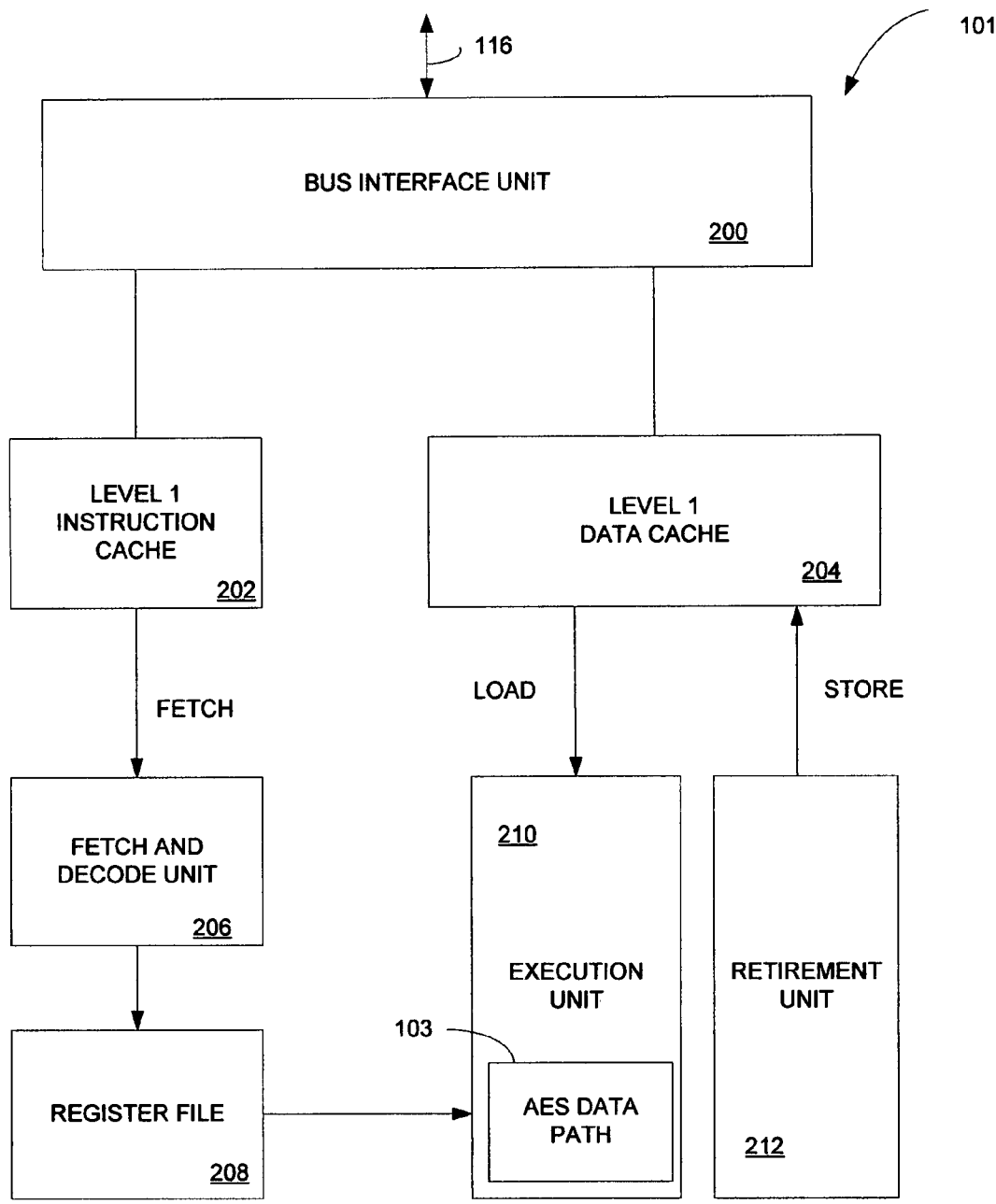
FIG. 2 is a block diagram of an embodiment of the processor shown in FIG. 1.

FIG. 2 is a block diagram of an embodiment of the processor 101 shown in FIG. 1. Processor 101 includes a fetch and decode unit 206 for decoding processor instructions received from Level 1 (L1) instruction cache 202. Data to be used for executing the instruction may be stored in register file 208. In one embodiment, the register file 208 includes a plurality of 128-bit registers, which are used by an aes instruction to store data for use by the aes instruction.

In one embodiment, the register file is a group of 128-bit registers similar to the 128-bit MMX registers provided in Intel Pentium MMX Processors that have a Streaming (Single Instruction Multiple Data (SIMD)) Extension (SSE) Instruction set. In a SIMD processor, data is processed in 128-bit blocks which may be loaded at one time. The 128-bit registers allow instructions to be applied to a 128-bit block (16 bytes) in one operation.

The fetch and decode unit 206 fetches macroinstructions from L1 instruction cache 202, decodes the macroinstructions and breaks them into simple operations called micro operations (pops). The execution unit 210 schedules and executes the micro operations. In the embodiment shown, the aes data path 103 in the execution unit 210 includes micro operations for an aes instruction. The retirement unit 212 writes the results of executed instructions to registers or memory.

Figure 3:
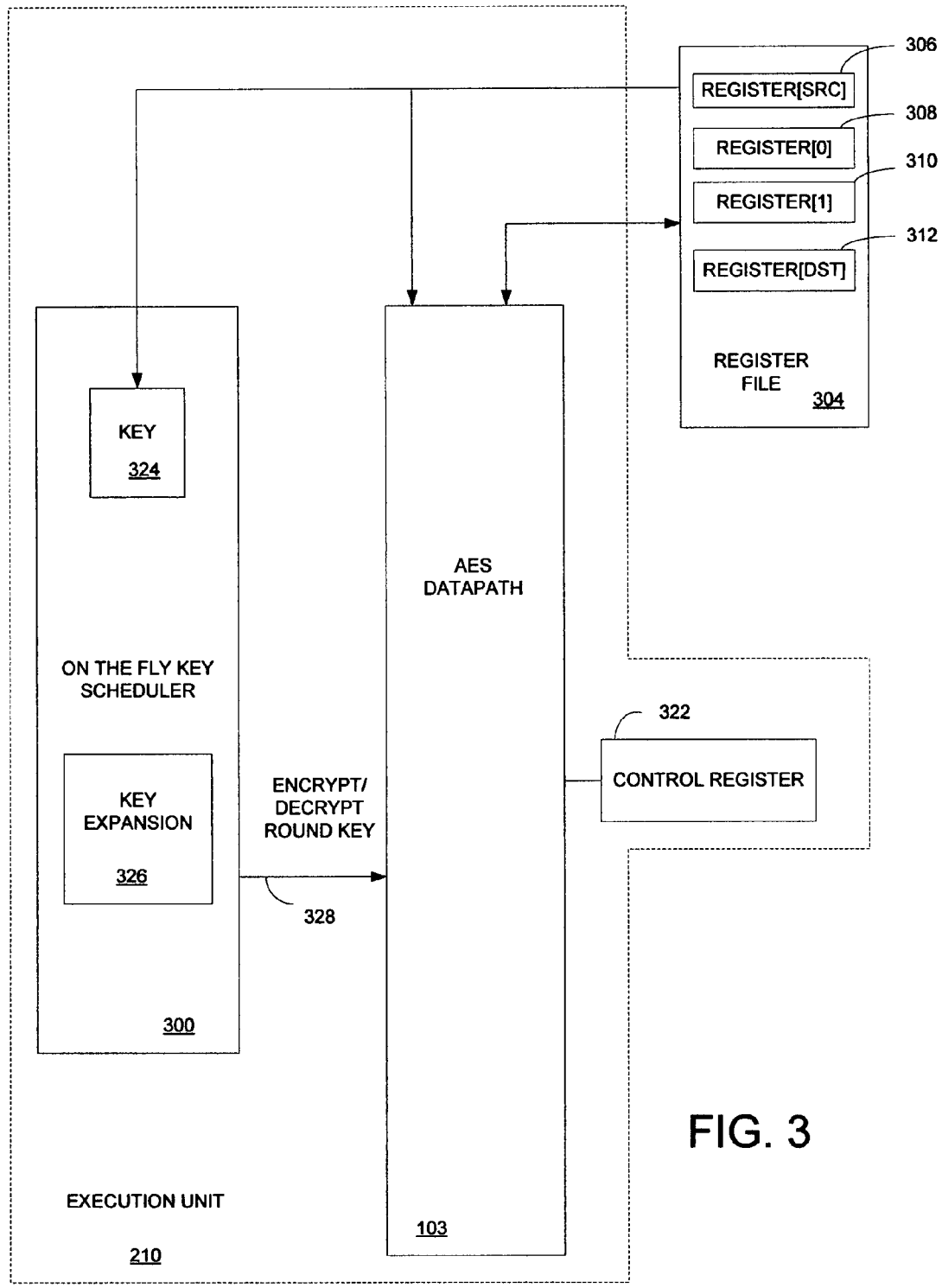
FIG. 3 is a block diagram of a portion of the processor shown in FIG. 1 that includes an embodiment of an execution unit shown in FIG. 2 for performing AES decryption.

FIG. 3 is a block diagram of a portion of the processor 101 shown in FIG. 1 that includes an embodiment of an execution unit 210 shown in FIG. 2 for performing AES encrypt and decrypt.

AES has a fixed block size of 128 bits and a key size of 128, 192 or 256 bits and operates on a 4×4 (16 bytes (128-bit fixed block size)) array of bytes, which is referred to as the 'state'. The AES algorithm transforms a 128-bit plaintext block into a 128-bit block of cipher text (encrypts) or a 128-bit block of cipher text into a 128-bit block of plaintext (decrypts) in 10, 12, or 14 consecutive rounds, with the number of rounds dependent on the key size (128, 192 or 256-bits).

Table 1 below shows an example of the 128-bit result of performing AES encryption using a 128-bit key on a 128-bit block input.

TABLE 1

| | |
|---|---|
| 128-bit Input: | 00112233445566778899aabbccddeeff (Hexadecimal) |
| 128-bit Key: | 000102030405060708090a0b0c0d0e0f (Hexadecimal) |
| 128-bit Result: | 69c4e0d86a7b0430d8cdb78070b4c55a (Hexadecimal) |

In an embodiment, an AES instruction (macro instruction) to perform AES encryption or decryption in the aes data path 103 may be defined symbolically as:

REG[dest]=aes(REG[src],
  key-size={128, 192, 256},
  #rounds={1,10,12,14},
  op={encrypt/decrypt},
  special_last_round={true/false})

Upon decoding the aes instruction, a number of parameters to be used to control the flow in each aes round are stored in a control register 322. The parameters include the size of the key (128-bits, 192-bits or 256-bits), number of rounds (1, 10, 12 or 14), the type of operation (encrypt/decrypt) and whether there is a special last round. AES micro operations perform n rounds of AES accordingly based on the value of n. With a number of rounds value of 10, 12, 14, the aes micro operations may perform the current standard aes for key sizes of 128-bits, 192-bits or 256-bits. By allowing the type of round (last or not last) to be programmable, an AES-like cipher with 20 rounds (with an AES-style last round), or only a "one round" pass may be performed using the same aes instruction and aes micro operations.

When the operation (op) that is selected is encrypt (cipher), the AES data path 103 performs a series of transformations using a secret key (cipher key) to transform intelligible data referred to as "plaintext" into an unintelligible form referred to as "cipher text" as shown above in Table 1. The transformations in the cipher that are performed by the aes data path 103 for each of the rounds (1, 10, 12 or 14) with a round key 328 provided by an on-the-fly key scheduler 300 include: (1) adding a round key (value derived from the cipher key) to the state (a two dimensional array of bytes) using a Exclusive OR (XOR) operation; (2) processing the state using a non-linear byte substitution table (S-Box); (3) cyclically shifting the last three rows of the state by different offsets; and (4) taking all of the columns of the state and mixing their data (independently of one another) to produce new columns. If the "special_last_round" is "true" transformation (4) is not performed for the last round.

The register file 304 has a plurality of 128-bit registers (REG) which may be used by the AES instruction. One of the 128-bit registers REG[src] is designated to store a source operand for the first aes round and another one of the 128-bit registers REG[dst] to store the result of the aes instruction. A 128-bit data block to be encrypted or decrypted by the aes instruction is loaded into a source register 306 in the register file 304 prior to issuing the aes instruction. The source operand is transformed in a number of rounds (1, 10, 12 or 14) to provide the result of the encrypt/decrypt of the 128-bit source data. The source operand may be 128-bits of plaintext to be encrypted using the key or 128-bits of cipher text to be decrypted using the key.

After an aes instruction has been decoded by the fetch and decode unit 206, the execution of the aes instruction by the execution unit 210 involves performing the micro operations associated with the aes instruction. The execution unit 210 retrieves the source operand and the original key that are stored in the register file 304 prior to performing the encrypt or decrypt operation using the micro operations for the aes instruction. In the embodiment shown, the source operand [SRC] (128-bit block state) is stored in register 306 and the 128-bit, 192-bit or 256-bit key is stored in register(s) 308, 310 in the register file 304. In the case of a 128-bit key, the entire 128-bits of the key are stored in one of the 128-bit registers in the register file 304, for example, register 308. For key sizes greater than 128 bits, the most significant bits (greater than 128 bits) are stored in another 128-bit register, for example, register 310. The key size parameter for the aes instruction indicates whether the key is stored in one register or more than one register in the register file 304. The one or more registers in the register file 304 that store the key are not modified during the execution of the aes instruction. In other embodiments other registers in the register file 304 may be used to store the key and the source operand. After the execution of the aes instruction is complete, the result [DST] is stored in register 312 in the register file 304.

In order to reduce the memory required for storing the expanded key (that is, the round keys for each of the 10, 12 or 14 rounds) associated with the key, the execution unit 210 includes an on-the-fly key scheduler 300. Instead of pre-generating the expanded key and storing it in a table, the on-the-fly key scheduler 300 generates the encrypt/decrypt "round key" 328 on-the-fly, that is, as it is needed for the next aes round. The encrypt/decrypt round key 328 is forwarded to the aes datapath 103 for use in the next aes round. The on-the-fly scheduler 300 includes a 256-bit key register 324 to store the original key from which the expanded key is generated. The original key is loaded into the 256-bit key register from one or both registers 308, 310 in the register file 304 dependent on the size of the key (128, 192 or 256).

The key expansion 326 expands the n-bytes of the original key stored in register 304 into b-bytes of an expanded key with the first n-bytes of the expanded key being the original key. For example, for a 128-bit key, the 128-bit key is expanded into a 176-bytes expanded key, that is, 11×16-bytes, with the first 16-bytes being the original 128-bit key, and thus the number of rounds is 10. The 24 bytes of a 192-bit key are expanded into 208 bytes (13×16 bytes) to provide 12 "round keys" one for each of the 12 rounds and the 32 bytes of a 256-bit key are expanded into 240 bytes (15×16 bytes) to provide 14 "round keys" one for each of the 14 rounds.

Figure 4:
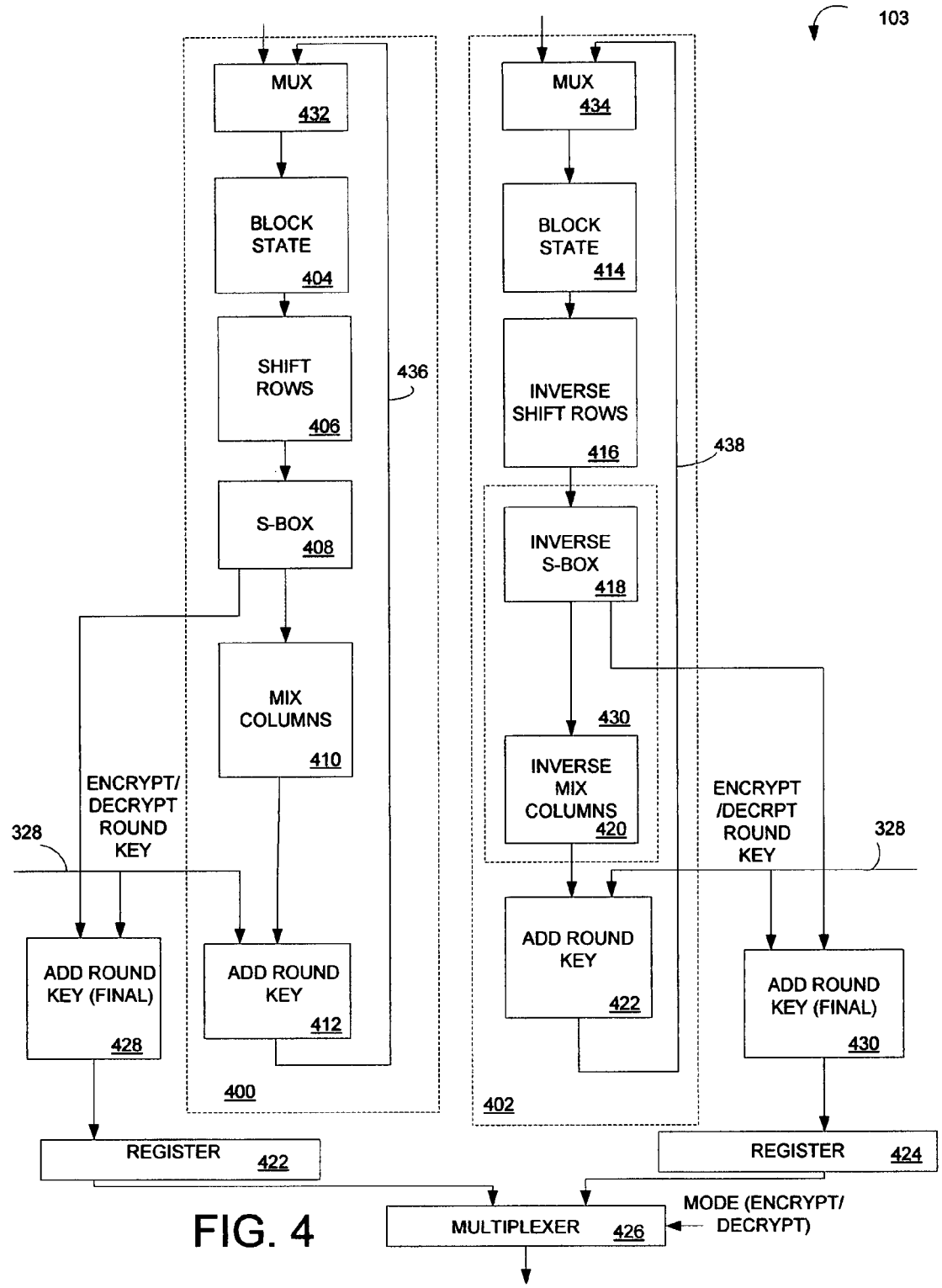
FIG. 4 is a block diagram of an embodiment of the AES data path shown in FIG. 3 that includes a decryption data path.

FIG. 4 is a block diagram of an embodiment of the aes data path 103 shown in FIG. 3. The aes data path 103 includes two independent data paths: an encrypt data path 400 and a decrypt data path 402. The encrypt data path (cipher) 400 performs an aes encrypt round and includes micro operations for the following stages: block state 404, SubBytes (S-box) 408, shift rows 406, mix columns 410 and add round key 412. The decrypt data path (inverse cipher) 402 performs an aes decrypt round and includes micro operations for the following stages: Inverse ShiftRows 416, Inverse SubBytes (S-Box) 418, Inverse MixColumns 420 and Add Round Key 422. In another embodiment the round operation sequence for the decrypt data path 402 may reverse the Inverse MixColumns 420 and Add Round Key 422 with the sequence of operations being performed in the following order: Inverse ShiftRows 416, Inverse SubBytes (S-Box) 418, Add Round Key 422 and Inverse Mix Columns 420.

From an architectural visibility, there is exactly one state which is shared across the encrypt data path 400 and the decrypt data path 402. When the initial state is loaded, both block state 404 and block state 414 are loaded with the same value through respective multiplexers 432, 434. The encrypt round key and decrypt round key are registered separately by providing a separate block state 404, 414 for the aes encrypt data path 400 and the aes decrypt data path 402. For example, encrypt round key 436 is directed to block state 404 and decrypt round key 438 is directed to block state 406. After each aes encrypt/decrypt round, each block state 404, 414 is updated with the respective next aes round value from the respective add round key stage 412, 430. However, only one block state value is valid dependent on whether the mode of operation is encrypt or decrypt.

The output of the last encrypt round from the encryption data path 400 is stored in register 422. The output of the last decrypt round from the decrypt data path 402 is stored in register 424. A multiplexer 426 is added after the aes encrypt data path 400 and aes decrypt data path 402 to select whether the output of the last aes round is taken from the aes encrypt data path 400 or the aes decrypt data path 402. Multiplexer 426 allows the result of the last round from the aes encrypt path or the result of the last round from the aes decrypt path 402 to be output as the result of the aes instruction based on whether the mode is encrypt or decrypt.

By separating the aes encrypt data path 400 and the aes decrypt data path 402, additional logic that is used at various stages for selecting whether the aes operation is encrypt or decrypt is not needed. Thus, critical path delay through the aes data path 103 is reduced.

Furthermore, the aes encrypt data path 400 and the aes decrypt data path 402 may be individually optimized. For example, the inverse mix columns 420 in the aes decrypt data path 402 incurs more delay that the corresponding mix columns 410 in the aes encrypt data path 400 due to additional Exclusive OR (XOR) gates. By separating the aes encrypt data path 400 and the aes decrypt data path 402, this additional delay is removed from the critical path of the aes encrypt data path 400.

The final round value is bypassed from the encrypt data path 400 and decrypt data path 402 before being registered in respective registers 422, 424 and prior to the mix-column transforms (mix columns 410 in the encrypt path, and inverse mix columns 422 in the decrypt data path). An Add round key (final) stage 420 is added for performing the add round key operation for the final aes round for encryption. An Add round key (final) stage 430 is added for performing the add round key operation for the final aes round for decryption. The additional add round key (final) stages 420, 430 are separated from the encrypt data path 400 and the decrypt data path 402. Thus, this results in a decrease in the critical path delay in the final aes encrypt round and the final aes decrypt round.

Furthermore, as the inverse mix columns 420 is not performed in the final aes decrypt round and the mix columns 410 is not performed in the final aes encrypt round, the additional delay due to multiplexer 426 is hidden in the non-critical final decrypt/encrypt aes round. The delay appears to be hidden because no additional delay is added to the aes encrypt path 400 and the delay added through add round key final 428 and multiplexer 426 is less than the delay through Mix Columns 410.

The encrypt/decrypt mode selects whether the encrypt value or the decrypt value is valid and the valid result is output through multiplexer 426. The reduction in the critical path delay due to the partitioning of the aes data path 103 into separate aes encrypt/decrypt data paths 400, 402 allows for a corresponding increase in the processor's clock frequency.

As discussed, an encryption and a decryption operation is performed on a 128-bit block state in parallel and the valid result (either the encrypt or decrypt result) of the operation is output. The flow through the aes encrypt data path 400 and the aes decrypt data path 402 for performing an encrypt/decrypt operation on a 128-bit block is described below.

When the fetch and decode unit 206 decodes an aes instruction, the original key and the data block (128-bits) to be encrypted that are stored in the register file 304 are forwarded to the aes encrypt path 400 and the aes decrypt path 402 in the aes data path 103 for processing. A multiplexer 432 selects whether the respective input to the block states 404, 414 is taken from the register file 304 or is an aes round key 436 from a previous aes encrypt round or aes decrypt round.

In block state 404, the 128-bit input (state) to the aes encrypt round is added with a round key (128-bit portion of the expanded key associated with the round) using bitwise XOR to produce a 128-bit intermediate value (state).

In Shift Rows 406, the 128-bit intermediate value (state) passes through a bit-linear transform in which bytes in each row of the 4×4 array (state) are shifted cyclically to the left. The number of places each byte is shifted differs for each row in the 4×4 array.

In S-box (SubBytes) 408, each byte of the result of Shift Rows is substituted with another byte value that can be stored and retrieved from a lookup table also referred to as a substitution box or "S-Box". The S-box takes some number of input bits, m, and transforms them into some number of output bits, n and is typically implemented as a lookup table. In one embodiment a fixed lookup table may be used. This operation provides non-linearity through the use of the inverse function over Galois Field (GF)($2^8$). For example, the n-bit output may be found by selecting a row in the lookup table using the outer two bits of the m-bit input, and selecting the column using the inner bits of the m-bit input.

In Mix Columns 410, the results from S-Box 408 passes through a bit-linear transform in which each column of the 4×4 array (state) is treated as a polynomial over a binary Galois Field (GF)($2^8$) and is then multiplied modulo $x^4+1$ with a fixed polynomial $c(x)=3x^3+x^2+x+2$.

An add round key 412 after Mix Columns 410 performs an exclusive OR function on the next aes round key 328 received from the on-the-fly scheduler 300 and the result of the aes round.

A last aes encrypt round differs from the other aes decrypt rounds in that it omits the Mix Columns stage 410.

In block state 414, the 128-bit input (state) to the aes decrypt round is added with a round key (128-bit portion of the expanded key associated with the round) using bitwise XOR to produce a 128-bit intermediate value (state).

In Inverse Shift Rows 418, the inverse operation to Shift Rows 406 is performed.

In the inverse S-box (SubBytes) 416, the inverse operation to S-box 408 is performed.

In Inverse Mix Columns 420, the following inverse mix column transformation is performed for each byte (s0-S3) for each of the four columns (c) in the 4×4 array:

$$s'0,c=(\{0E\}\cdot s0,c)\oplus(\{0B\}\cdot s1,c)\oplus(\{0D\}\cdot s2,c)\oplus(\{09\}\cdot s3,c)$$

$$s'1,c=(\{09\}\cdot s0,c)\oplus(\{0E\}\cdot s1,c)\oplus(\{0B\}\cdot s2,c)\oplus((\{0D\}\cdot s3,c)$$

$$s'2,c=(\{0D\}\cdot s0,c)\oplus(\{09\}\cdot s1,c)\oplus(\{0E\}\cdot s2,c)\oplus(\{0B\}\cdot s3,c)$$

$$s'3,c=(\{0B\}\cdot s0,c)\oplus(\{0D\}\cdot s1,c)\oplus(\{09\}\cdot s2,c)\oplus(\{0E\}\cdot s3,c)$$

The transformation shown above is for one column (c). The column has four bytes labeled s0, s1, s2, s3. E, B, D and 9 are constant polynomial values that are multiplied with each byte to compute an output byte (s'0-s'1). Each output byte s'0, s'1, s'2, s3 is computed by multiplying all the bytes in the column by a different one of the constant values and performing an exclusive OR (XOR) operation on the result of each multiplication operation. Thus, each output byte requires four multiplication operations and three XOR operations. The constant polynomial multiplications require a significant amount of XOR operations in addition to the three XOR operations per output byte per column. Thus, the inverse mix columns adds significant critical path delay to the decrypt data path 402.

An add round key 422 after the Inverse Mix Columns stage 420 performs an exclusive OR function on the encrypt/decrypt round key 328 from the on-the-fly-scheduler 300 and the result of the previous aes decrypt round operation.

A last aes decrypt round differs from the other aes decrypt rounds in that it omits the Inverse Mix Columns stage 420.

The critical delay path through the Inverse Mix Columns 420 and Inverse S-box 418 in the decrypt data path 402 may be reduced by combining the inverse s-box and inverse Mix Column operations according to an embodiment of the present invention.

As both inverse S-box and polynomial multiplication operations are combinations of XOR logic, in an embodiment of the present invention, the polynomial multiplication operations are embedded in the inverse combination s-box and Mix Columns 430. Instead of a lookup table, the inverse combination S-box and Mix Columns 430 uses a functional composite-field to perform inverse S-box operations.

The inverse SubByte transformation is constructed by composing two transformations:
1. Affine transformation
2. Inversion in GF($2^8$)

The field GF($2^8$) is an extension of the field GF($2^4$). Therefore, each element, a, in GF($2^8$) may be represented as a polynomial of the form $a_h x + a_1$ in GF($2^4$). Thus, the Inversion in GF($2^8$) can be realized by polynomial inversion in GF($2^4$) as follows:

$$(a_h x + a_1)^{-1} = (a_h \otimes d)x + (a_h \oplus a_1)\otimes d \quad \text{Equation 1}$$

$$d((a_h^2 \otimes \{0E\}) \oplus (a_h \otimes a_1) \oplus a_1^2)^{-1} \quad \text{Equation 2}$$

Figure 5:
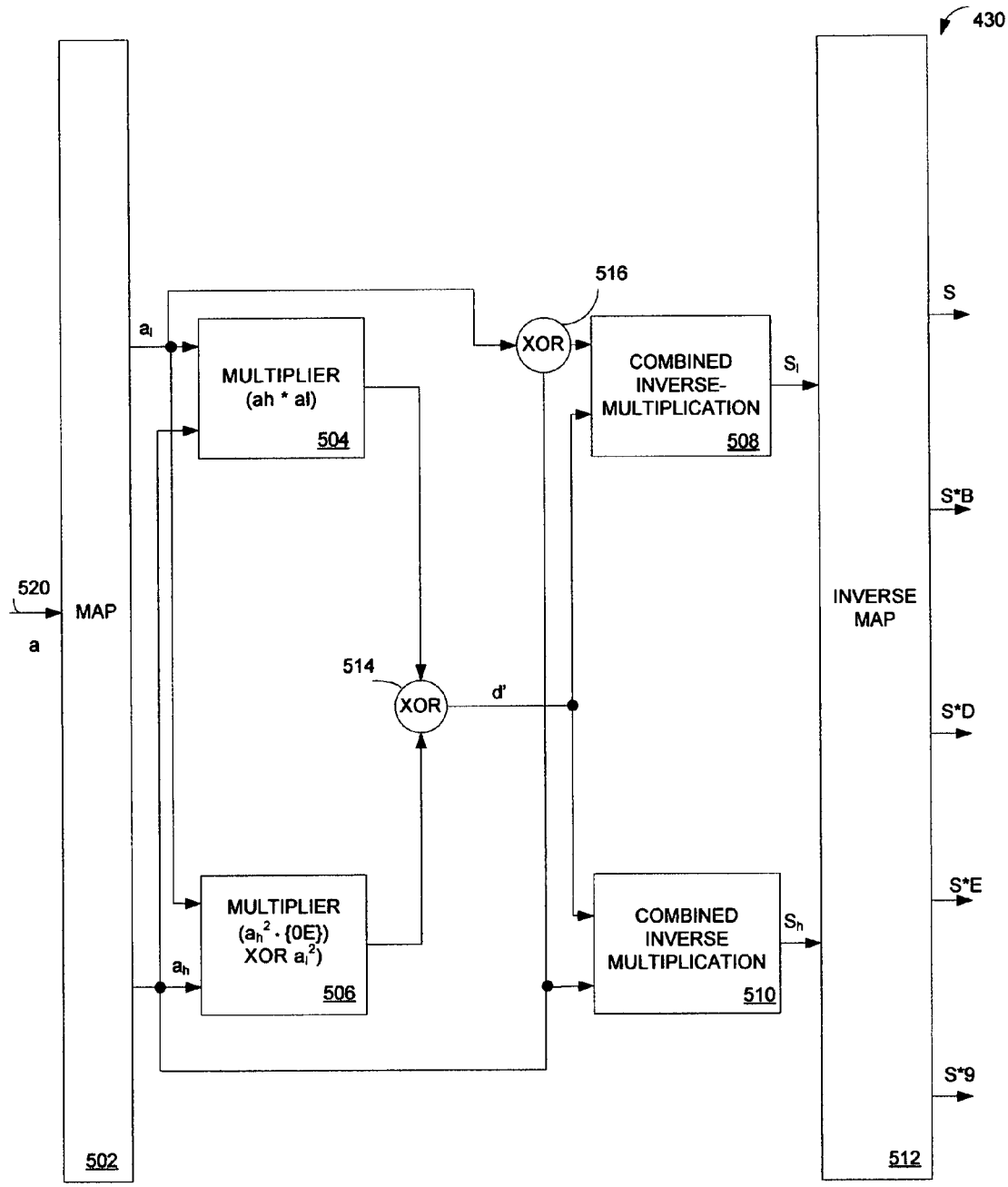
FIG. 5 is a block diagram illustrating an embodiment for performing an inversion in $GF(2^8)$ for one byte(8-bits) in the 128-bit data path.

FIG. 5 is a block diagram illustrating an embodiment for performing an inversion in GF($2^8$) for a sub (8-bits) in the 128-bit data path. The 'element a' 520 is 8-bits and represents a polynomial in GF($2^8$).

A map operation is performed on the byte a in GF($2^8$) 520 in map 502 to represent the element, a, in GF($2^8$) as a polynomial of the form $a_h x + a_1$ in GF($2^4$). SubByte $a_h$ is the high-order 4 bits and SubByte $a_1$ is the low-order 4-bits of byte a. The inverse subByte of a in GF($2^8$), that is, $(a)^{-1}$ is represented in GF($2^4$) by $(a_h x + a_1)^{-1}$ in Equation 1 above and first requires the computation of d as shown in Equation 2 shown above.

Multipliers 504, 506 and XOR function 514 perform computation for Equation 1 above. SubBytes $a_h$ and $a_1$ are input to multipliers 504 and 506. Multiplier 504 computes $(a_h \otimes a_1)$ in Equation 2 and multiplier 506 computes $((a_h^2 \otimes \{0E\}) \oplus a_1^2)$ in equation 2. The result of multiplier 504 and multiplier 506 is XORed in XOR function 514 which provides the result of Equation 3 below:

$$d'=((a_h^2 \otimes \{0E\}) \oplus (a_h \otimes a_1) \oplus a_1^2) \quad \text{Equation 3}$$

As the critical delay path is through multipliers 504, 506 and XOR function 514. In order to decrease the delay in the critical delay path, instead of performing the inverse operation required by Equation 2 after the XOR function 514, the inverse operation is performed later in combined inverse multiplication operations 508, 510.

After d' has been computed, there are two multiplication operations that can be computed in parallel using d' by combined inverse multiplication operations 508, 510. Combined inverse multiplication 508 performs $(a_h \oplus a_1) \otimes d$ with the result of $(a_h \oplus a_1)$ received from XOR function 516. Combined inverse multiplication 510 performs $(a_h \otimes d)$ x.

As discussed earlier, the critical delay path is the computation of d' through multipliers 504, 506 and XOR function 514. As the inversion of a co-efficient in $GF(2^4)$ may be embedded in a look-up table, the inversion of d' may be embedded inside a look-up table in combined inverse-multiplication 508, 510. This removes the inverse operation of d' to provide d as required by Equation 2 from the critical delay path.

After the multiplication and inverse operations have been performed in combined inverse-multiplication 508, 510, the inverse map operation 512 converts the elements in $GF(2^4)$ back to the field $GF(2^8)$. In order to further decrease the critical path delay in the aes decrypt data path, the inverse map operation 512 may also include 4 polynomial multiplications in $GF(2^8)$, that are embedded in the inverse map operation. The 4 polynomial multiplications in $GF(2^8)$ provide the results of multiplying the result of the combined inverse-multiplication by each of the 4 constant polynomial values, that is, E, B, D and 9 required by the inverse mix columns transformation.

In addition to performing a transform from 4 to 8 bit fields, the inverse map operation 512 also performs an inverse affine transform for decrypt as specified by FIPS 197. The combination of the inverse affine transform for decrypt in the inverse map operation 512 further reduces the delay through the aes decrypt path 402.

Figure 6:
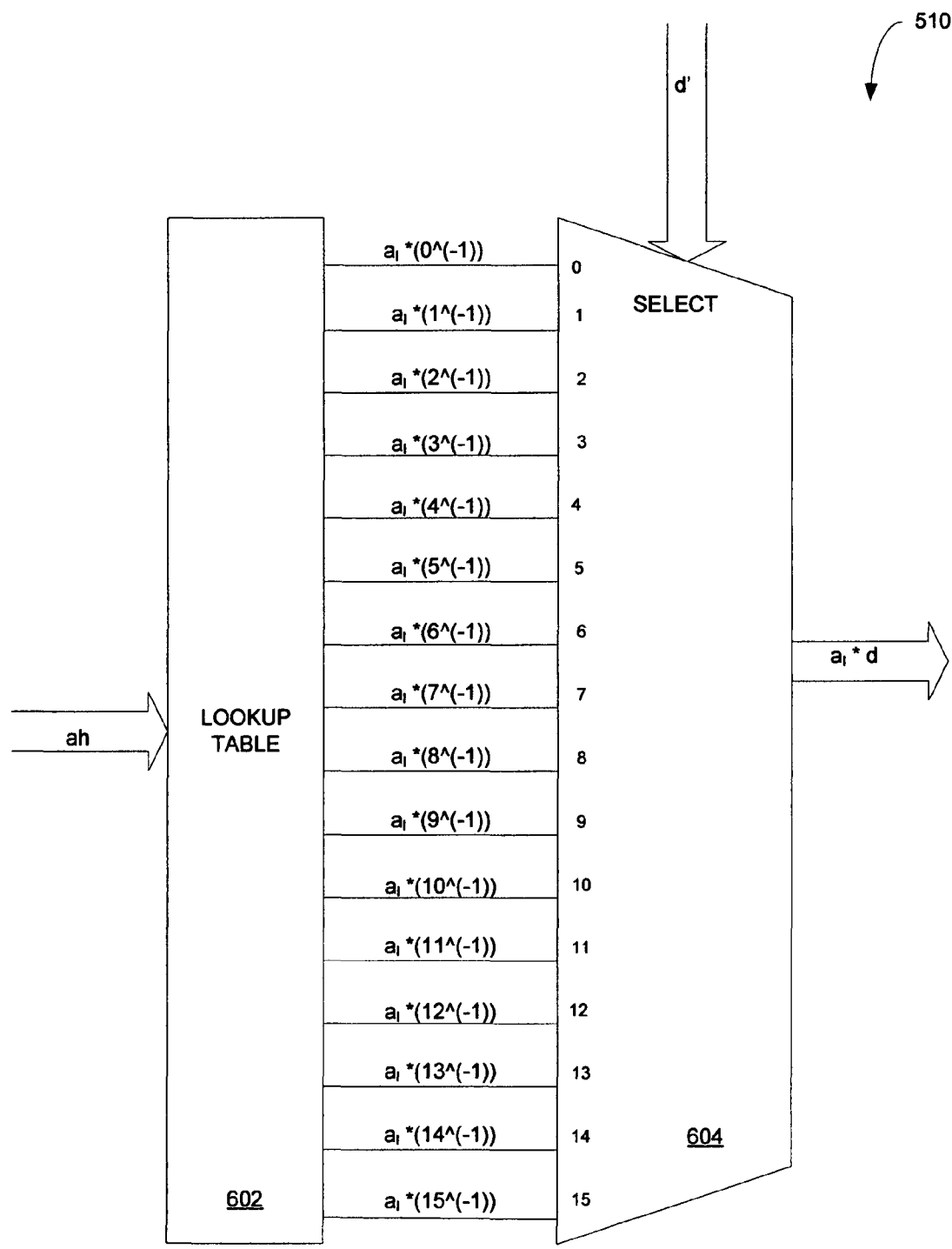
FIG. 6 illustrates an embodiment of any one of the combined inverse multiplication operations shown in FIG. 5.

FIG. 6 illustrates an embodiment of any one of the combined inverse multiplication operations 508, 510 shown in FIG. 5. While d' is being computed by multipliers 506, 504, the input to combined multiplication operations 508, 510, that is, either $a_h \oplus a_1$ or $a_h$ is input to a lookup table (memory) 602 to select a set of pre-computed multiplication results for multiplying a first operand ($a_h$ or $a_1$) by all possible values of a second operand (d). In the embodiment shown in FIG. 6, combined inverse multiplication 510 provides the result of multiplying a 4-bit value $a_h$ by a 4-bit value d.

For example, in an embodiment in which d has 4-bits, there are 16 possible values (0000b-1111b). Thus, the 16 possible results from the multiplication of $a_h$ (first operand) with each of the 16 possible values of d' (second operand) is stored in a lookup table 602. As shown in FIG. 6, all of the possible results of the multiplication of $a_h$ by d are stored in the lookup table 602. Upon receiving a request to output results of multiplication operations for an $a_h$ input, the result of multiplying $a_h$ by the inverse of each possible value of d' (d), that is, $a_h*(0^{\wedge}(-1))-ah*(15^{\wedge}(-1))$ that are stored in the lookup table 602 are output to the inputs (labeled 0-15) of multiplexer 604. After d' has been computed by multipliers 504, 506 and XOR function 513, the d' selects one of the inputs of the multiplexer 604 to be output as $d*a_h$.

As the computation of d' is on the critical delay path, d' is used to select the result of the multiplication operation from the multiplexer 604. $a_h$ is used to select the outputs of the lookup table 602, while d' is being computed. When d' is available, the combined result of the multiplication of $a_h$ with d (inverse of d') is output from the multiplexer 604 based on the value of d'.

For example, if $a_h$ is 1001b, this value is multiplied by each of the possible values of d (that is, 0000b-1111b) and stored in the lookup table 602. These values are output from the lookup table 602 and provided at the 16 inputs of the multiplexer 604. When d' has been computed, it selects the input of the multiplexer that is the result of $a_h*d$ which is output from the multiplexer 604. For example, if d' is 1010b, d is 0101b, input 10 is selected by d' which is the result of $a_h*0101b$. As the lookup table 602 combines the multiplication function and the inverse function, critical path delay is decreased.

For example, for four bit operands (selector d', operand d and operand $a_h$) the increase in the area for storing the pre-computed result values is not significant. Also the delay for looking up the pre-computed values in the lookup table 602 is hidden by the time taken to compute d' in multiplication operations 504, 506 and XOR function 514.

To further decrease the critical delay path in the decrypt data path, the inverse map 512 may pre-compute results of multiplication by constant polynomials E, B, D and 9 that for use in the inverse mix columns transformation as follows:

$$s'0,c = (\{0E\} \cdot s0,c) \oplus (\{0B\} \cdot s1,c) \oplus (\{0D\} \cdot s2,c) \oplus (\{09\} \cdot s3,c)$$

$$s'1,c = (\{09\} \cdot s0,c) \oplus (\{0E\} \cdot s1,c) \oplus (\{0B\} \cdot s2,c) \oplus (\{0D\} \cdot s3,c)$$

$$s'2,c = (\{0D\} \cdot s0,c) \oplus (\{09\} \cdot s1,c) \oplus (\{0E\} \cdot s2,c) \oplus (\{0B\} \cdot s3,c)$$

$$s'3,c = (\{0B\} \cdot s0,c) \oplus (\{0D\} \cdot s1,c) \oplus (\{09\} \cdot s2,c) \oplus (\{0E\} \cdot s3,c)$$

Figure 7:
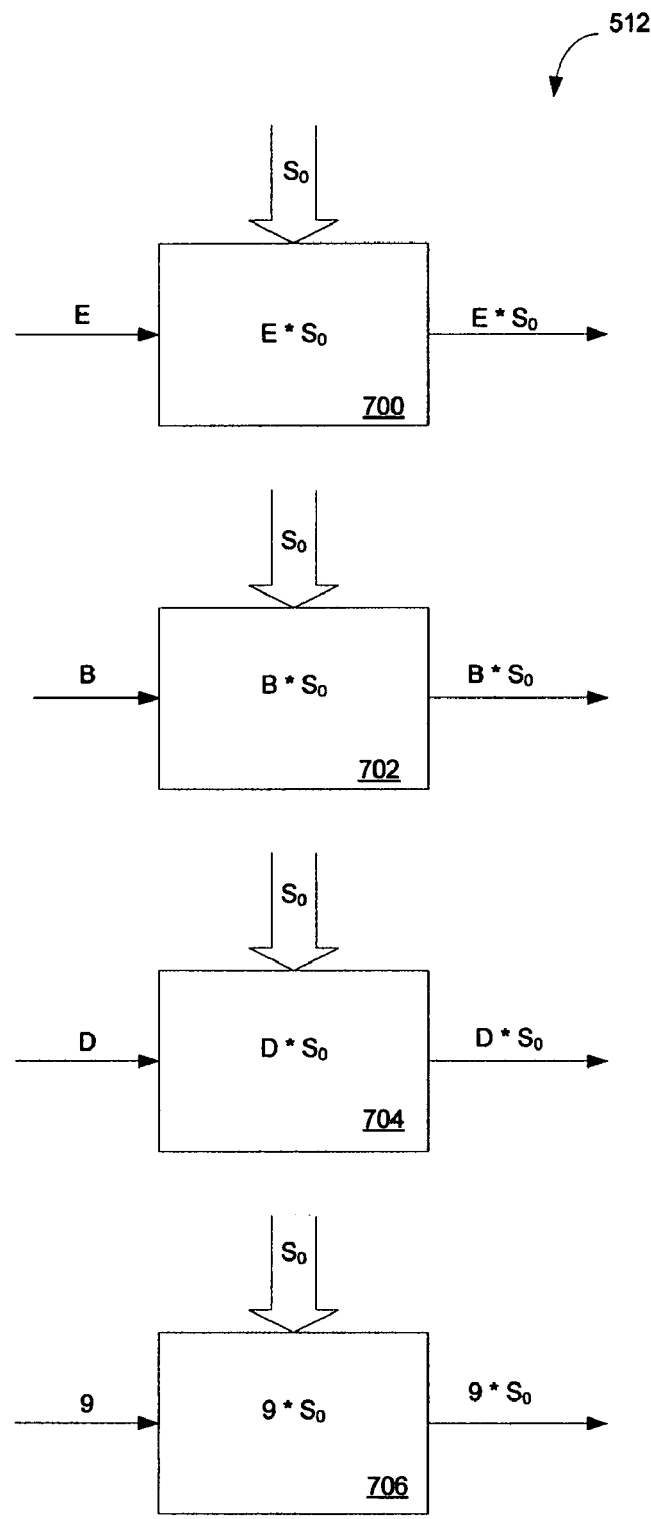
FIG. 7 is a block diagram illustrating multipliers for computing constant polynomial multiplications in the inverse map shown in FIG. 5.

FIG. 7 is a block diagram illustrating multipliers for performing constant polynomial multiplication operations in the inverse map 512 shown in FIG. 5. In the embodiment shown, each multiplier 700, 702, 704, 706 stores pre-computed results of multiplication by one of the polynomials E, 9, D or B for all possible values of a 4-bit subByte (lower bits or upper bits) of one of the bytes s0, s1, s2 or s3. For example, multiplier 700 stores the results of multiplying polynomial E with all combinations of a 4-bit subByte having 16 possible values 0000b-1111b.

Each multiplier 700, 702, 704, 706 includes a 16:1 multiplexer 604 as discussed in conjunction with FIG. 6. However, as one of the operands is constant (E, 9, D or B) no lookup table 602 is required. Instead, the stored pre-computed results that may be stored in memory are provided at the inputs of the multiplexer 604.

One of the stored pre-computed results is selected based on the value of the subByte. The pre-computation of all possible results of multiplication of the constant polynomial by all possible subByte values decreases the delay through the inverse map 512 for performing the inverse mix columns transformation. The pre-computed results for each of the subBytes are then used to compute the outputs (s'0-s'3) of the inverse mix column transformation using XOR logic to perform the XOR operations.

Figure 8:
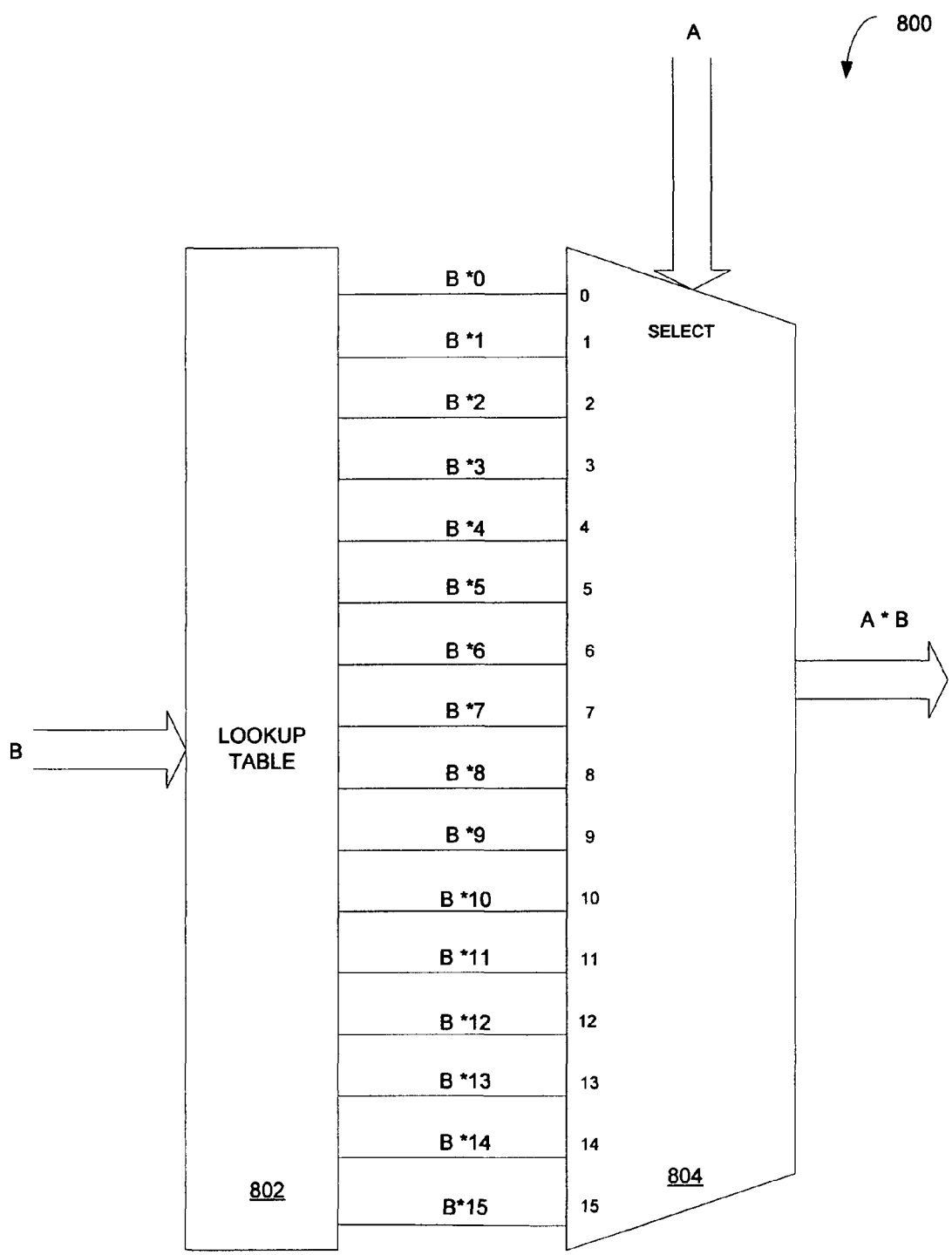
FIG. 8 illustrates an embodiment of a multiplier for a general multiply when the inputs have asymmetric arrival times.

FIG. 8 illustrates an embodiment of a multiplier 800 for a general multiply when the operands (inputs) have asymmetric arrival times. Referring to FIG. 8, multiplier 800 includes a lookup table 802 that stores the result of pre-computing polynomial B with all combinations of 4-bit subByte A.

While the subByte A is being computed as discussed in conjunction with FIG. 5, the result of multiplying B by each possible value of subByte B is provided at the inputs of 16:1 multiplexer 804. The subByte A selects the appropriate input and the result of the multiplication by B for subByte $A_1$ is output after a multiplexer delay time which is shorter than the time to perform the multiplication of B by subByte A An embodiment of the multiplier for computing constant polynomial computations shown in FIG. 8 may be used to decrease critical path delay where there is asymmetric delay, that is, delay through one path is slower than through another path. For example, when a lookup of the lookup table 802 may be performed while the multiplexer selector (A) is being computed on the critical delay path. The operand computed via the slowest path (A) is used to select the output of the multiplexer 804 and the operand computed via the faster path (B) is used to perform the table lookup. Thus, the critical path delay is decreased because the delay through the multiplexer is less than the added delay of performing the multiplication operation after both operands are valid. In an embodiment, multiplier 800 may be used to perform the multiplication operation in multiplier 504 shown in FIG. 5.

It will be apparent to those of ordinary skill in the art that methods involved in embodiments of the present invention may be embodied in a computer program product that includes a computer usable medium. For example, such a computer usable medium may consist of a read only memory device, such as a Compact Disk Read Only Memory (CD ROM) disk or conventional ROM devices, or a computer diskette, having a computer readable program code stored thereon.

While embodiments of the invention have been particularly shown and described with references to embodiments thereof, it will be understood by those skilled in the art that various changes in form and details may be made therein without departing from the scope of embodiments of the invention encompassed by the appended claims.

The invention claimed is:

1. An apparatus comprising:
a memory to store pre-computed results of a multiplication operation performed on a first operand and all possible values of a second operand; and
a multiplexer having a plurality of inputs and a single output, each of the plurality of inputs to receive one of the pre-computed results from the memory, a selector corresponding to -one of the possible values of the second operand to select the one of the pre-computed results for the single output, wherein
the selector is an inverse of the second operand; and
the one of the pre-computed results combines the multiplication operation and an inverse operation.

2. The apparatus of claim 1, wherein the selector, the first operand and the second operand each have 4 bits.

3. The apparatus of claim 1, further comprising:
a plurality of multiplexers, each of the multiplexers to receive results of the multiplication operation performed on one of a plurality of constant polynomial values and all possible values of the second operand, the outputs of each multiplexer to be combined to provide a result of the inverse mix columns transformation.

4. The apparatus of claim 3, wherein the plurality of constant polynomial values are used for inverse mix columns transformation in a decrypt operation in an Advanced Encryption Standard (AES) decrypt path.

5. The apparatus of claim 1, wherein the pre-computed result is used to perform an inverse subbyte transformation in a decrypt operation in an Advanced Encryption Standard (AES) decrypt path.

6. The apparatus of claim 1, wherein the selector is valid after the first operand.

7. A method comprising:
storing pre-computed results of a multiplication operation performed on a first operand and all possible values of a second operand in a memory; and
selecting one of the pre-computed results provided at inputs to a multiplexer based on a selector to the multiplexer, the selector corresponding to one-of the possible values of the second operand, wherein
the selector is an inverse of the second operand; and
the one of the pre-computed results combines the multiplication operation and an inverse operation.

8. The method of claim 7, wherein the selector, the first operand and the second operand each have 4 bits.

9. The method of claim 7, further comprising:
receiving results of the multiplication operation performed on one of a plurality of constant polynomial values and all possible values of the second operand by one of a plurality of multiplexers, the outputs of each multiplexer to be combined to provide a result of the inverse mix columns transformation.

10. The method of claim 9, wherein the plurality of constant polynomial values are used for inverse mix columns transformation in a decrypt operation in an Advanced Encryption Standard (AES) decrypt path.

11. The method of claim 7, wherein the pre-computed result is used to perform an inverse subbyte transformation in a decrypt operation in an Advanced Encryption Standard (AES) decrypt path.

12. The method of claim 7, wherein the selector is valid after the first operand.

13. A system comprising:
a dynamic random access memory to store data and instructions; and
a processor coupled to said memory to execute the instructions, the processor comprising:
a memory to store results of a multiplication operation performed on a first operand and all possible values of a second operand; and
a multiplexer having a plurality of inputs and a single output, each of the plurality of inputs to receive one of the results from the memory, a selector corresponding to one of the possible values of the second operand to select the one of the results for the single output, wherein
the selector is an inverse of the second operand; and
the one of the results combines the multiplication operation and an inverse operation.

14. The system of claim 13, wherein the selector, the first operand and the second operand each have 4 bits.

15. The system of claim 13, wherein the plurality of constant polynomial values are used for inverse mix columns transformation in a decrypt operation in an Advanced Encryption Standard (AES) decrypt path.

* * * * *